(12) United States Patent
Bean et al.

(10) Patent No.: US 11,293,829 B1
(45) Date of Patent: Apr. 5, 2022

(54) LIQUID SENSOR ASSEMBLY

(71) Applicant: ZF Active Safety and Electronics US LLC, Livonia, MI (US)

(72) Inventors: Michael Bean, Saint Clair, MI (US); Brian Urbach, Rochester Hills, MI (US); Paul Chen, Troy, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 0 days.

(21) Appl. No.: 17/244,312

(22) Filed: Apr. 29, 2021

(51) Int. Cl.
*G01M 3/16* (2006.01)
*G01D 11/24* (2006.01)
*B62D 15/00* (2006.01)

(52) U.S. Cl.
CPC ............. *G01M 3/16* (2013.01); *G01D 11/245* (2013.01); *B62D 15/00* (2013.01)

(58) Field of Classification Search
CPC ................................ G01M 3/16; G01D 11/245
See application file for complete search history.

(56) References Cited

FOREIGN PATENT DOCUMENTS

| CN | 112067201 A | * | 12/2020 | ............ G01M 3/045 |
| DE | 102019115867 A1 | * | 12/2020 | ........... B62D 5/0403 |
| KR | 20080002056 A | * | 1/2008 | |

* cited by examiner

*Primary Examiner* — Jamel E Williams
(74) *Attorney, Agent, or Firm* — Robert James Harwood

(57) ABSTRACT

A liquid sensor assembly has a sensor housing including a first portion, a second portion, and a cover defining an interior cavity. The second portion has a cap and at least one sidewall extending along an axis from the cap to a first surface of the first portion. The at least one sidewall has at least one inlet opening for liquid to pass into the cavity. The cap is free from openings. The cover engages a second surface of the first portion. The first and second surfaces of the first portion are opposite one another. A liquid sensor is in the cavity for sensing the presence of liquid in the sensor housing.

12 Claims, 2 Drawing Sheets

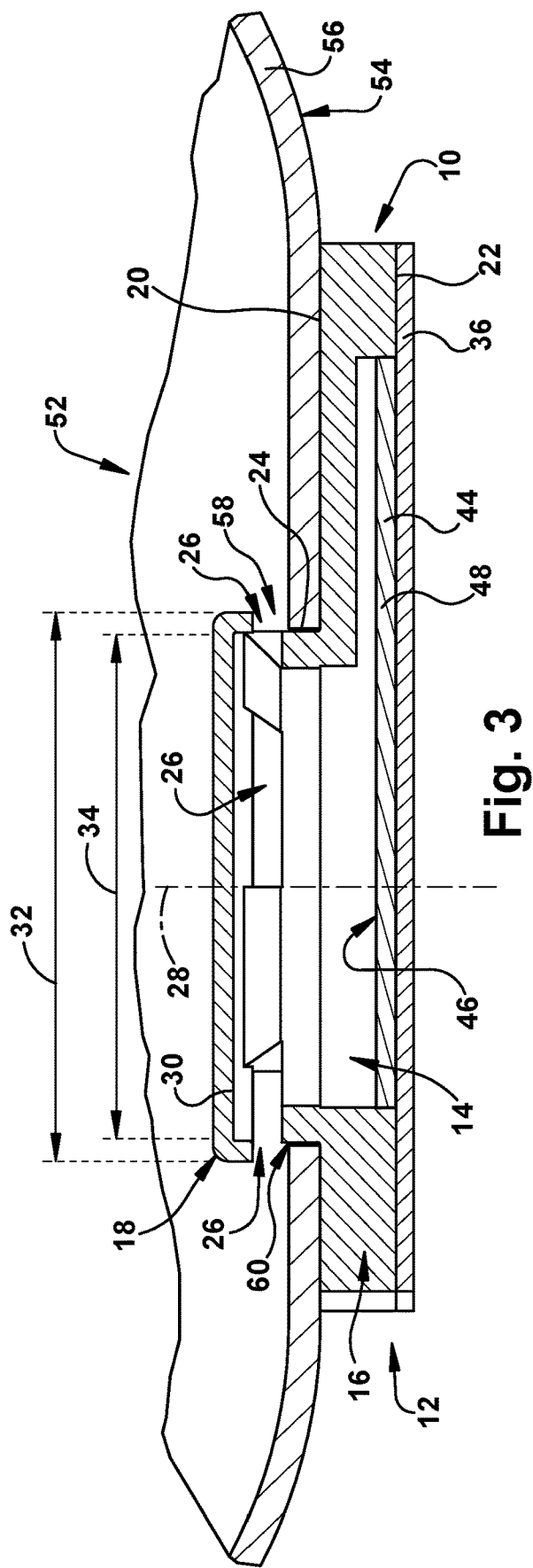

LIQUID SENSOR ASSEMBLY

FIELD OF THE INVENTION

The present invention is directed to a liquid sensor assembly and, more particularly, to a liquid sensor assembly having openings for sensing the presence of liquids in a housing.

BACKGROUND OF THE INVENTION

Liquid in certain systems can cause the systems to degrade and/or be compromised. For example, water ingression in a steering system can lead to increased friction in the steering system. Although sensors for detecting the presence of liquid are known, they are not commonly used in steering systems. The steering systems, instead, utilize robust sealing solutions in their designs to keep water from entering the systems as a first line of defense. Known steering systems also utilize friction detection algorithms to deduce when a possible issue has occurred. These friction detection algorithms, however, have limitations.

SUMMARY OF THE INVENTION

According to one aspect, a liquid sensor assembly can include a sensor housing. The sensor housing can define an interior cavity that is at least partially closed at one end by a cap and at an opposite end by a cover. The sensor housing can have at least one sidewall extending along an axis from the cap. The at least one sidewall can have at least one inlet opening for liquid to pass into the cavity. The cap can be free from openings. A liquid sensor can be in the cavity for sensing the presence of liquid in the sensor housing.

According to another aspect, alone or in combination with any other aspect, a steering system can include a steering system housing and the liquid sensor assembly. The at least one sidewall can extend through an opening in the steering system housing so that the at least one sidewall and the cap are at least partially inside the steering system housing. The at least one inlet opening can be inside the steering system housing for liquid to pass from inside the steering system housing into the cavity. A portion of the sensor housing can be outside the steering system housing.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 3 is a schematic cross-sectional view of an example use application for the liquid sensor assembly of FIG. 1.

DETAILED DESCRIPTION OF THE INVENTION

Figure 1:
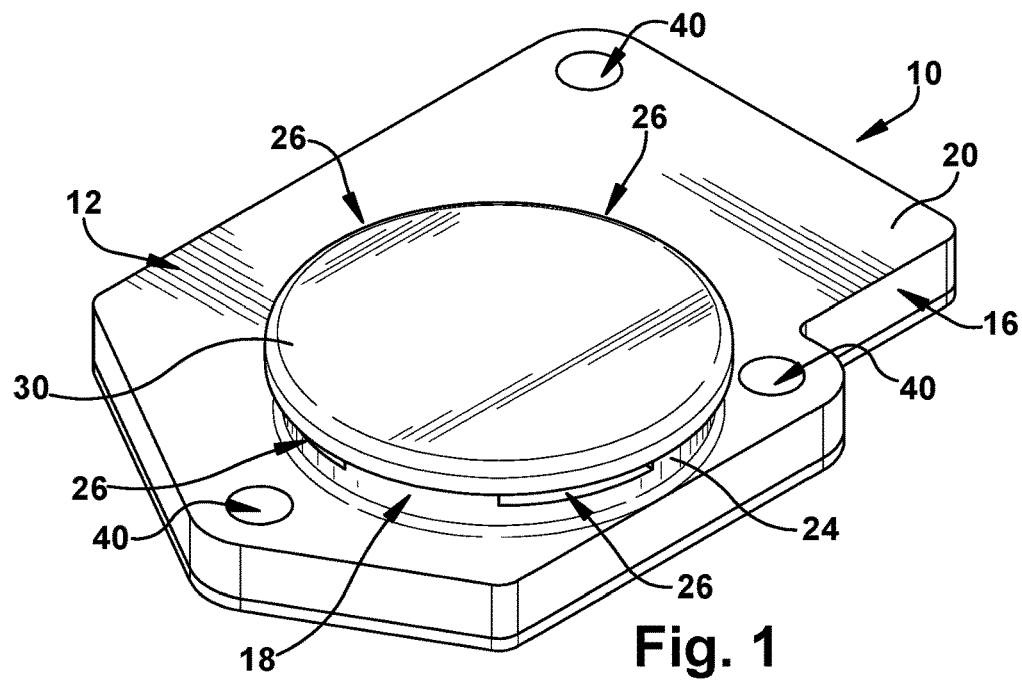
FIG. 1 is a schematic perspective side view of a liquid sensor assembly constructed in accordance with the present disclosure.
Figure 2:
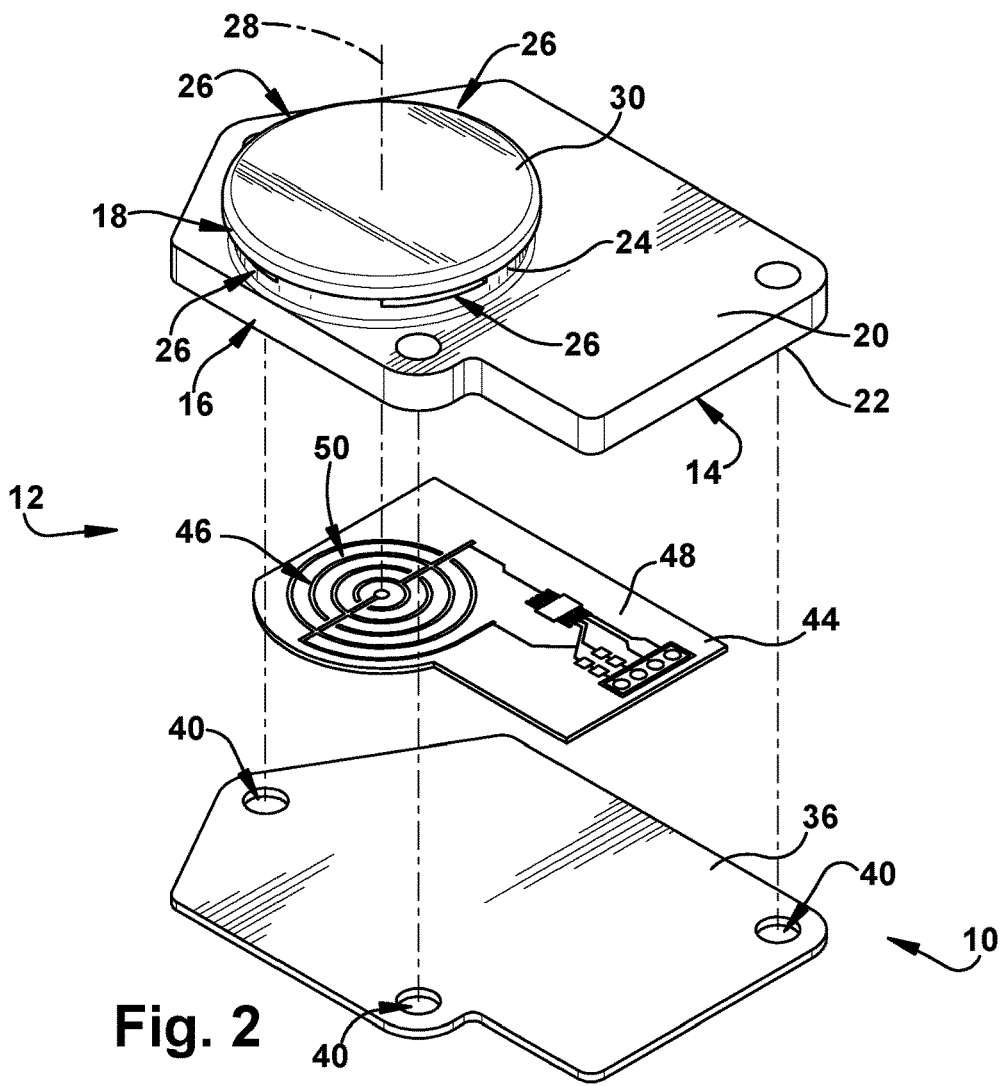
FIG. 2 is an exploded view of the liquid sensor assembly of FIG. 1.

A liquid sensor assembly 10 constructed in accordance with the present invention is shown in FIGS. 1-2. The liquid sensor assembly 10 includes a sensor housing 12 defining an interior cavity 14. The sensor housing 12 has first and second portions 16, 18 that may be formed as one piece. The first portion 16 has opposite first and second surfaces 20, 22. The second portion 18 includes at least one sidewall 24 that extends along an axis 28 from the first surface 20. In the example configuration shown in FIGS. 1-2, the second portion 18 includes one cylindrical sidewall 24. The second portion 18, however, can have any number of sidewalls 24 defining a variety of shapes.

A plurality of inlet openings 26 radially extend through the cylindrical sidewall 24 for the passage of liquid into the cavity 14. Although the cylindrical sidewall 24 is shown and described as having a plurality of inlet openings 26, the cylindrical sidewall can have only one inlet opening.

As shown in FIGS. 1-3, the cylindrical sidewall 24 may extend along the axis 28 to a cap 30. A diameter 32 of the cap 30 may be greater than a diameter 34 of the cylindrical sidewall 24. In such a configuration, at least a portion of the cap 30 overhangs the cylindrical sidewall 24 and inlet openings 26 to at least partially block contaminants, such as solid particles and grease, from entering the cavity 14 through the inlet openings. The cap 30 can also be free from openings that extend in the axial direction to prevent contaminants from axially entering the cavity 14 through the cap.

As shown in FIGS. 1-2, the sensor housing 12 also includes a cover 36 that engages the second surface 22 of the first portion 20 when secured to the first portion. The first portion 20 and the cover 36 may be secured to one another by fasteners. As shown in the example configuration of FIGS. 1-2, the cover 36 and the first portion 20 have axially ending fastener openings 40 for receiving such fasteners. Alternatively, the cover 36 and the first portion 20 can be secured to one another in any other manner, such as through the use of adhesives. The cover 36, when secured to the first portion 20, helps define and enclose the cavity 14.

A liquid sensor 44 in the cavity 14 includes a liquid sensing portion 46 on a substrate 48. The liquid sensing portion 46 may be formed from one or more capacitors 50 that are arranged on the substrate 48 and/or in the sensor housing 12 so that they intersect the axis 28. With such an arrangement, liquid flowing into the cavity 14 drops onto the one or more capacitors 50. The one or more capacitors 50 are configured such that liquid contact causes changes in their capacitance. Therefore, the liquid sensor 44 may detect the presence of liquid in the sensor housing 12 by measuring changes in capacitance at the one or more capacitors 50. The liquid sensor 44 may be electrically connected, such as by a wired or wireless connection, to other systems and/or controllers that may issue an alert when liquid is detected and/or cause operational changes when liquid is detected.

The liquid sensor assembly 10 may be used in any application for detecting the presence of liquid. FIG. 3 illustrates one example application for the liquid sensor assembly 10.

A portion of a steering system 52 for use in a vehicle 54 is shown in FIG. 3. The steering system 52 includes a steering system housing 56. The steering system housing 56 can contain multiple components of the steering system 52 that cause steerable vehicle wheels to turn when directed. For example, the steering system housing 56 can contain one or more pulleys, a timing belt for interconnecting the pulleys, and a push rod for deflecting the vehicle wheels.

The steering system housing 56 is designed having a lowest elevation point 58 to which liquid, when present inside the steering system housing, flows. The liquid sensor assembly 10 can be connected to the steering system housing 56 at the lowest elevation point 58. When connected, the cylindrical sidewall 24 extends through an opening 60 in the lowest elevation point 58 so that a portion of the cylindrical sidewall, the inlet openings 26 and the cap 30 are inside the steering system housing 56, while the remainder of the liquid sensor assembly 10 remains outside the steering system housing.

During operation of the vehicle 54, the steering system components in the steering system housing 56 can generate contaminants, such as belt dust, metal chips and grease. The overhang of the cap 30 helps prevent these contaminants from entering the cavity 14 through the inlet openings 26 and damaging the liquid sensor 44. The lack of axial openings in the cap 30 also helps prevent the contaminants from entering the cavity 14 in the axial direction. Liquid and environmental contaminants from a surface on which the vehicle 54 travels or a surrounding environment may also attempt to enter the liquid sensor assembly 10 through the portion of the liquid sensor assembly that remains outside of the steering system housing 56. The portion of the liquid sensor assembly 10 outside of the steering system housing 56 may be free from openings that could allow liquid and the environmental contaminates from entering the liquid sensor assembly. Therefore, only liquid from inside the steering system housing 56 is permitted to pass into the cavity 14 to be detected.

Liquid, such as water, in the steering system housing 56 flows toward the lowest elevation point 58. The flowing water enters the cavity 14 through the inlet openings 26 adjacent the lowest elevation point 58 and drops onto the liquid sensing portion 46. The liquid sensor 44 detects the presence at the liquid sensing portion 46. In turn, the liquid sensor 44 communicates to a driver of the vehicle 54 and/or to an electronic control unit ("ECU") within the vehicle the detected presence of water. Because the liquid sensor assembly 10 is configured so that only liquid that enters the cavity 14 from the steering system housing 56 is detected, the driver/ECU is notified that water is present in the steering system housing.

Advantageously, the liquid sensor assembly 10 helps prolong the life of the components in the steering system housing 56 by permitting water in the steering system housing to drain out of the steering system housing instead of remaining in the steering system housing and further degrading the components.

From the above description of the invention, those skilled in the art will perceive improvements, changes and modifications. Such improvements, changes and modifications within the skill of the art are intended to be covered by the appended claims.

Having described the invention, the following is claimed:

1. A liquid sensor assembly, comprising:
   a sensor housing defining an interior cavity that is at least partially closed at one end by a cap and at an opposite end by a cover, the sensor housing having at least one sidewall extending along an axis from the cap, the at least one sidewall having at least one inlet opening for liquid to pass into the cavity, the cap being free from openings; and
   a liquid sensor in the cavity for sensing the presence of liquid in the sensor housing.

2. The liquid assembly recited in claim 1, wherein the sensor housing includes a first portion and a second portion, the second portion including the cap and the at least one sidewall extending along the axis from the cap to a first surface of the first portion, the cover engaging a second surface of the first portion when secured to the first portion, the first and second surfaces of the first portion being opposite one another.

3. The liquid sensor assembly recited in claim 2, wherein the first and second portions are formed as one piece, the cover being formed separate from the first and second portions and securable to the second surface of the first portion.

4. The liquid sensor assembly recited in claim 1, wherein the liquid sensor includes a liquid sensing portion on a substrate, the liquid sensing portion intersecting the axis.

5. The steering system recited in claim 4, wherein the liquid sensing portion is formed from one or more capacitors, the liquid sensor detecting the presence of liquid by measuring changes in capacitance at the one or more capacitors.

6. The liquid sensor assembly recited in claim 1, wherein the at least one sidewall is a cylindrical sidewall extending along the axis from the cap, the at least one inlet opening in the second portion radially extending through the cylindrical sidewall.

7. The liquid sensor assembly recited in claim 6, wherein a diameter of the cap is greater than a diameter of the of the cylindrical sidewall, at least a portion of the cap being configured to at least partially block contaminants from entering the cavity through the at least one inlet opening.

8. A steering system, comprising:
   a steering system housing; and
   the liquid sensor assembly recited in claim 1, at least one sidewall extending through an opening in the steering system housing so that the at least one sidewall and the cap are at least partially inside the steering system housing, the at least one inlet opening being inside the steering system housing for liquid to pass from inside the steering system housing into the cavity, a portion of the sensor housing being outside the steering system housing.

9. The steering system recited in claim 8, wherein the at least one sidewall is a cylindrical sidewall extending along the axis from the cap, the cylindrical sidewall extending through the opening in the steering system housing, the at least one inlet opening in the second portion radially extending through the cylindrical sidewall.

10. The steering system recited in claim 9, wherein a diameter of the cap is greater than a diameter of the of the cylindrical sidewall, at least a portion of the cap being configured to at least partially block contaminants generated in the steering system housing from entering the cavity through the at least one inlet opening.

11. The steering system recited in claim 8, wherein the steering system housing has a lowest elevation point of the steering system housing to which liquid inside the steering system housing flows, the opening in the steering system housing extending through the steering system housing at the lowest elevation point, the at least one sidewall extending through the opening in the steering system housing so that the at least one sidewall and the cap are at least partially inside the steering system housing at the lowest elevation point.

12. The liquid sensor assembly recited in claim 8, wherein the liquid sensor includes a liquid sensing portion on a substrate, the liquid sensing portion intersecting the axis.

* * * * *